(12) United States Patent
Saliger et al.

(10) Patent No.: US 12,576,723 B2
(45) Date of Patent: Mar. 17, 2026

(54) ELECTRICAL CONTACTING APPARATUS FOR A CURRENT COLLECTOR OF A VEHICLE, CURRENT COLLECTOR AND VEHICLE

(71) Applicant: Siemens Mobility Austria GmbH, Vienna (AT)

(72) Inventors: Christian Saliger, Vienna (AT); Clemens Smejkal, Auersthal (AT); Christopher Flois, Vienna (AT)

(73) Assignee: Siemens Mobility Austria GmbH, Vienna (AT)

( * ) Notice: Subject to any disclaimer, the term of this patent is extended or adjusted under 35 U.S.C. 154(b) by 792 days.

(21) Appl. No.: 17/897,436

(22) Filed: Aug. 29, 2022

(65) Prior Publication Data

US 2023/0064169 A1 Mar. 2, 2023

(30) Foreign Application Priority Data

Aug. 31, 2021 (AT) .............................. A 50696/2021

(51) Int. Cl.
*B60L 5/22* (2006.01)
*B60L 5/08* (2006.01)
*B60L 5/24* (2006.01)
*B60L 5/38* (2006.01)

(52) U.S. Cl.
CPC ................. *B60L 5/22* (2013.01); *B60L 5/085* (2013.01); *B60L 5/24* (2013.01); *B60L 5/38* (2013.01); *B60L 2200/26* (2013.01)

(58) Field of Classification Search
CPC ........ B60L 5/38; B60L 2200/26; B60L 5/085; B60L 5/22; B60L 5/24; B60L 5/08
See application file for complete search history.

(56) References Cited

U.S. PATENT DOCUMENTS 4,464,546 A * 8/1984 Culver ...................... B60L 5/08
191/49
5,124,510 A * 6/1992 Garfinkle .................. B60L 5/19
191/65
(Continued)

FOREIGN PATENT DOCUMENTS

CN 1486888 4/2004
CN 1486888 A * 4/2004
(Continued)

OTHER PUBLICATIONS

Examination Report dated Feb. 22, 2022 based on A50696/2021 filed Aug. 31, 2021.

*Primary Examiner* — Cheng Lin
(74) *Attorney, Agent, or Firm* — Cozen O'Connor

(57) ABSTRACT

An electrical contacting apparatus for the current collector of a vehicle, includes at least an electrical first contact body that is coupled via at least a first spring apparatus to at least a first bearing apparatus, wherein the at least first bearing apparatus is connectable to a current collector linkage or to a current collector holder and where the at least first contact body is electrically connectable to the vehicle, where the at least first contact body and the at least first bearing apparatus are electrically insulated from each other such that it becomes possible to dispense with separate insulators for electrically insulating a current collector from its environment.

11 Claims, 2 Drawing Sheets

(56) References Cited

U.S. PATENT DOCUMENTS

| | | | | |
|---|---|---|---|---|
| 6,474,455 B1 * | 11/2002 | Blaschko | ................. | B60L 5/19 |
| | | | | 105/199.1 |
| 9,630,507 B2 * | 4/2017 | Zhang | ..................... | B61F 5/26 |
| 10,227,013 B2 * | 3/2019 | Tajima | ................... | B60L 53/35 |
| 10,792,969 B2 | 10/2020 | Wolf-Monheim | | |
| 2019/0111750 A1 | 4/2019 | Wolf-Monheim | | |

FOREIGN PATENT DOCUMENTS

| | | | | | |
|---|---|---|---|---|---|
| CN | 104999915 | | 10/2015 | | |
| CN | 205149551 | | 4/2016 | | |
| CN | 205149551 U | * | 4/2016 | | |
| CN | 104999915 B | * | 12/2017 | | |
| CN | 113212170 A | * | 8/2021 | ............... | B60L 5/22 |
| DE | 19541668 | | 2/1997 | | |
| DE | 102017218530 B4 | | 5/2021 | | |
| WO | 2021122375 | | 6/2021 | | |
| WO | WO-2021122375 A1 | * | 6/2021 | ............... | B60L 5/22 |

* cited by examiner

ELECTRICAL CONTACTING APPARATUS FOR A CURRENT COLLECTOR OF A VEHICLE, CURRENT COLLECTOR AND VEHICLE

BACKGROUND OF THE INVENTION

1. Field of the Invention

The invention relates to an electrical contacting apparatus for a current collector of a vehicle, having at least an electrical first contact body that is coupled via at least a first spring apparatus to at least a first bearing apparatus, where the at least first bearing apparatus can be connected to a current collector linkage or a current collector holder, and where the at least first contact body can be electrically connected to a vehicle.

2. Description of the Related Art

Electrically operated vehicles (for example, rail vehicles or commercial vehicles such as electric buses or electric trucks) often have current collectors (for example, single-arm or diamond current collectors, lateral current collectors, and/or charging current collectors), via which a current is collected from a contact wire, a conductor rail arranged, for example, at the side of a route, or a contact hood of a charging station, and electricity is supplied to battery packs and/or electrical drives of the vehicles.

It may be necessary to connect insulators to the current collectors or to arrange the current collectors on insulators to electrically insulate the current collectors from their environment. For example, post insulators are often used for this purpose.

WO 2021/122375 A1, for example, discloses a conventional rocker for a current collector of a vehicle, and a current collector. The rocker has contact strips that contact a contact wire and are connected to a current collector linkage via levers, torsion springs and a housing in which the torsion springs are mounted. The housing or the torsion springs can be realized in a fiber-reinforced synthetic material. Insulation of the current collector is effected by post insulators via which the current collector is mounted on the vehicle roof.

The above-described conventional approach has the disadvantage that post insulators are provided for the purpose of insulating the current collector, and these post insulators can result in a high vehicle mass or negatively affect aerodynamic properties of the vehicle.

SUMMARY OF THE INVENTION

In view of the foregoing, it is therefore an object of the invention to provide an electrical contacting apparatus that is further developed in relation to the prior art, which is formed as light as possible and with the fewest possible different components, and which can also be deployed for vehicles having strict requirements in respect of aerodynamic properties.

This and other objects and advantages are achieved in accordance with the invention by an electrical contacting apparatus, in which the at least first contact body and the at least first bearing apparatus are electrically insulated from each other, where the at least first spring apparatus is formed as an electrical insulator, and/or where the at least first spring apparatus is connected via a first housing to the at least first bearing apparatus, the at least first spring apparatus is mounted in the first housing and the first housing is formed as an electrical insulator, and/or where the at least first contact body is coupled via at least a first guide apparatus to the at least first bearing apparatus and at least a first guide rod of the at least first guide apparatus is formed as an electrical insulator. As a result, the contacting apparatus itself has an electrical insulation section or a plurality of electrical insulation sections. Electrical insulating functions can be linked with mechanical functions of the contacting apparatus. Separate insulators (for example, post insulators on a vehicle roof) are not required.

A reduction in structural complexity, a reduction in the quantity and variety of components, and a reduction in the demand for structural space are achieved thereby. With the electrical insulation section or electrical insulation sections, regions of the contacting apparatus are kept free from electrical high voltage. For example, sensors (for example, acceleration sensors, for example for monitoring and/or diagnostic functions) can be arranged in these regions.

For example, the first spring apparatus can be formed as an electrical insulator. This means that, for example, a springing function of the contacting apparatus is combined with an electrical insulating function, where the first spring apparatus mechanically decouples the first contact body and at the same time electrically insulates it from the first bearing apparatus.

If, for example, the first spring apparatus is connected to the first bearing apparatus via the first housing, the first spring apparatus being mounted in the first housing and the first housing being formed as an electrical insulator, the first spring apparatus is then protected from environmental influences, such as humidity and/or particles, while the first housing also contributes to the electrical insulation of the first contact body.

It is possible to reduce the load on the first spring apparatus while supporting and guiding the first contact body relative to the first bearing apparatus if, for example, the first contact body is coupled to the first bearing apparatus via the first guide apparatus, where the first guide rod of the first guide apparatus is formed as an electrical insulator. This combines, for example, a load reduction function, a support function and a guidance function with an electrical insulating function in the first guide apparatus.

It can be helpful in this case for the at least first spring apparatus to be formed in a fiberglass-reinforced synthetic material. The fiberglass-reinforced synthetic material results in a reliable electrical insulation and at the same time allows a reduction in mass. The first spring apparatus of fiberglass-reinforced synthetic material can also be coated with silicone, for example.

A particularly lightweight, compact and nevertheless robust and low-wear solution for the springing action and insulation of the first contact body is achieved if the at least first spring apparatus is designed as a torsion spring. In addition to its functions of mechanically decoupling the first contact body and acting as an insulator, the first spring apparatus can thereby also satisfy a torque transmission function between the first contact body and the first bearing apparatus.

Sophisticated connection apparatuses between the first contact body and the bearing apparatus, for example shafts surrounded by coil springs, are not required, i.e., separation of the springing function and the torque transmission function is not required. It can, however, also be beneficial for the at least first spring apparatus to be formed as a rubber spring element. A sprung connection having a particularly simple structure is thereby achieved between the first contact body and the first bearing apparatus, providing an electrical insulation at the same time.

The rubber spring element can be formed as a silicone elastomer or an ethylene-propylene copolymer. It is helpful in this context for the first housing to be formed in a fiberglass-reinforced synthetic material.

In addition to effective insulation of the first contact body, a reduction in mass is effected thereby, ensuring that the first housing results in minimal additional mass.

Both mass advantage and strong insulating effect are achieved if the at least first guide rod is formed in a fiberglass-reinforced synthetic material.

Advantages relating to the combination of mechanical functions and insulation functions as per the inventive contacting apparatus can be exploited for an electric rail vehicle or an electric commercial vehicle on an electrified street or highway (for example, for an electric truck or an electric bus), with the object of collecting current from a vehicle roof, if the at least first contact body is formed as a contact strip of a rocker for a roof current collector for a rail vehicle or an electric commercial vehicle.

A further field of application in the sector of rail vehicles (for example, for rail vehicles that are supplied with electricity via a conductor rail that is arranged at the side of a track, such as underground railways) is opened up if the at least first contact body is formed as a contact shoe for a lateral current collector for a rail vehicle.

The described advantages can, however, also be applied to a charging system of an electric commercial vehicle, such as an electric bus or an electric truck (for example, for charging a battery pack of the commercial vehicle), if the at least first contact body is embodied as a contact head for a charging current collector for an electric commercial vehicle.

It is also an object of the invention to provide a current collector for a vehicle, having at least one electrical contacting apparatus in accordance with the invention.

It is a further object of the invention to provide a vehicle having at least one current collector in accordance with the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is described below in more detail with reference to exemplary embodiments shown in the appended drawings, in which.

DETAILED DESCRIPTION OF THE EXEMPLARY EMBODIMENTS

Figure 1:
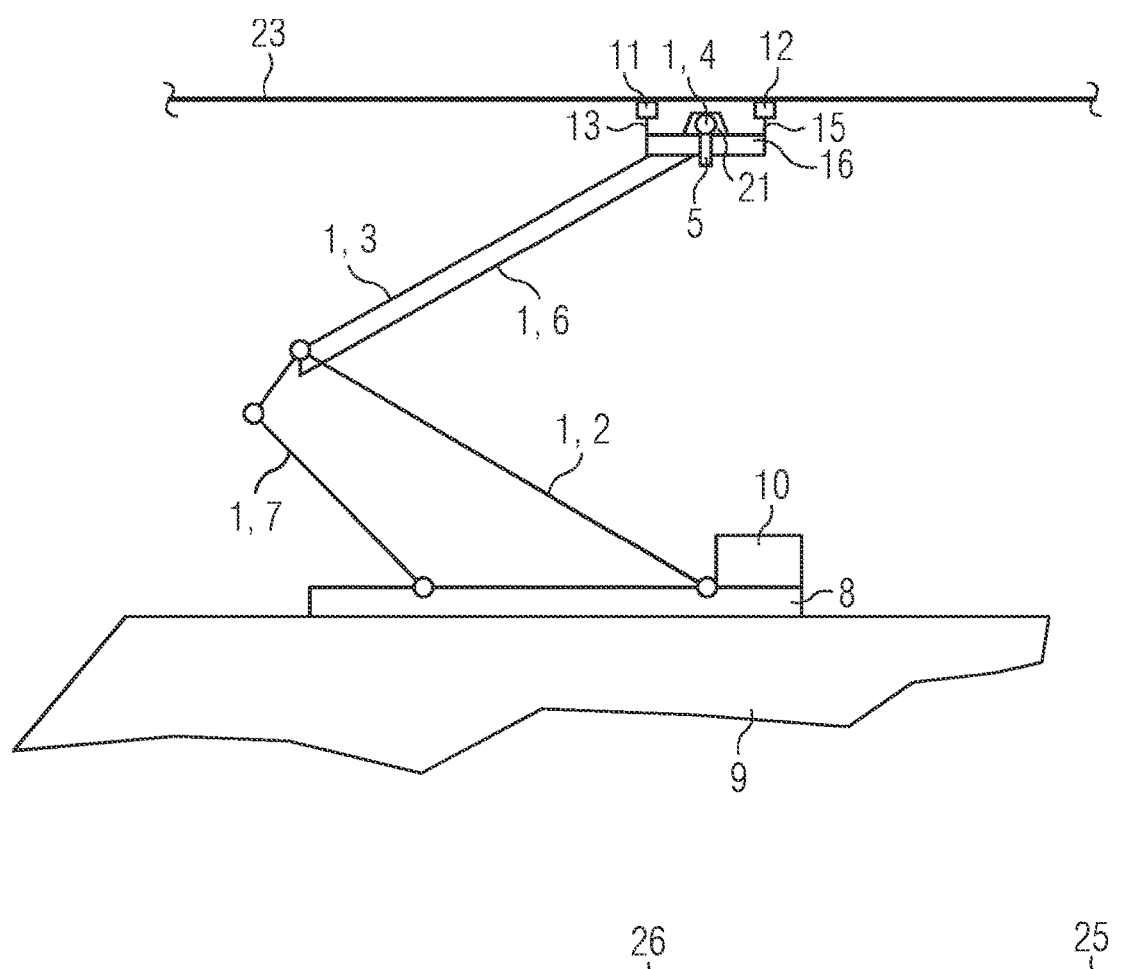
FIG. 1 shows a schematic illustration of an exemplary embodiment of an inventive current collector on an exemplary embodiment of an inventive vehicle, in a side view.

A side view which is schematically illustrated in FIG. 1 shows an exemplary embodiment of an inventive current collector of an exemplary embodiment of an inventive vehicle, with a current collector linkage 1 that has a lower arm 2, an upper arm 3, a top rod 4 with a first horn 5 and a second horn (not visible), a parallel guide rod 6 and a coupling rod 7. The lower arm 2 and the coupling rod 7 are connected in an articulated manner to a base frame 8 which is connected to a roof 9 of the vehicle. The current collector is therefore formed as a roof current collector. The vehicle is formed as a rail vehicle.

A pneumatic lifting drive 10 for raising and lowering the current collector is provided between the base frame 8 and the lower arm 2. The upper arm 3 is connected in an articulated manner to the lower arm 2 and in an articulated manner to the coupling rod 7, and the parallel guide rod 6 is connected in an articulated manner to the lower arm 2.

An exemplary embodiment of an inventive electrical contacting apparatus formed as a rocker is mounted on top of the current collector linkage 1 and has a first contact strip as an electrical first contact body 11, a second contact strip as an electrical second contact body 12, a first guide apparatus 13, a second guide apparatus 14 (visible in FIG. 2), a third guide apparatus 15 and a fourth guide apparatus (not visible).

Figure 2:
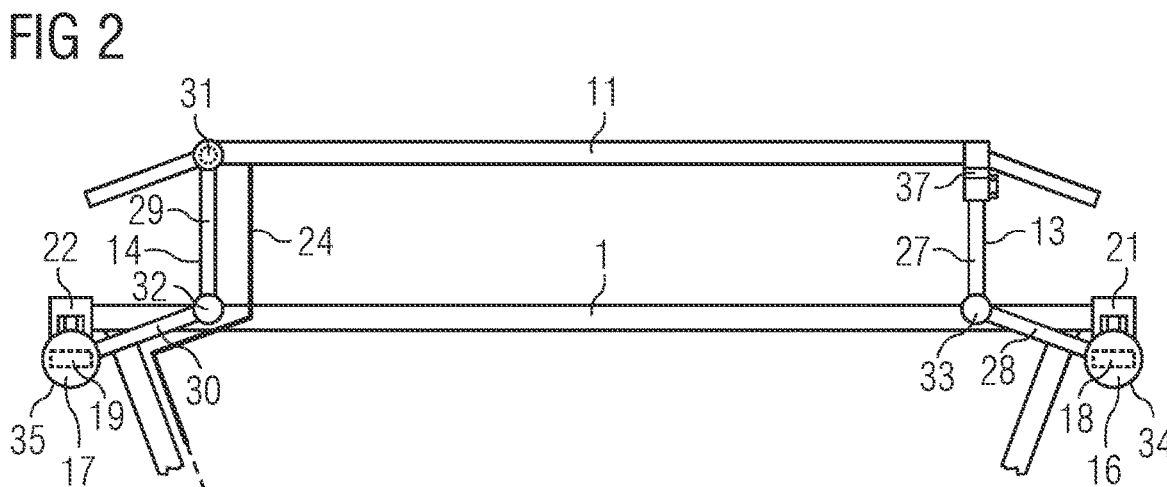
FIG. 2 shows a schematic illustration of an exemplary first embodiment of an inventive electrical contacting apparatus formed as a rocker of a current collector, in a front view.

The contacting apparatus further comprises a first housing 16 and a second housing 17, where the second housing 17 is visible in FIG. 2. Mounted in the interior of the first housing 16 and the second housing 17 are a first spring apparatus 18 and a second spring apparatus 19, shown in FIG. 2, a third spring apparatus 20, illustrated in FIG. 3, and a fourth spring apparatus (not visible), where spring apparatuses are formed as torsion springs and are connected to the first guide apparatus 13, the second guide apparatus 14, the third guide apparatus 15 and the fourth guide apparatus.

The contacting apparatus also has a first bearing apparatus 21 and a second bearing apparatus 22, visible in FIG. 2, via which the contacting apparatus is connected in an articulated manner to the top rod 4, i.e., to the current collector linkage 1.

The first contact body 11 and the second contact body 12 are therefore coupled to the first bearing apparatus 21 and to the second bearing apparatus 22 via the first guide apparatus 13, the second guide apparatus 14, the third guide apparatus 15, the fourth guide apparatus, the first spring apparatus 18, the second spring apparatus 19, the third spring apparatus 20, the fourth spring apparatus, the first housing 16 and the second housing 17. The first bearing apparatus 21 and the second bearing apparatus 22 are in turn connected to the current collector linkage 1.

The contacting apparatus is also connected in an articulated manner to the parallel guide rod 6 and rests against a contact wire 23 via the first contact body 11 and the second contact body 12, these having carbon contact piece (not illustrated) as known from the prior art, whereby the rail vehicle is supplied with electricity.

The first contact body 11 is electrically connected to the rail vehicle via a first power line 24, which is not visible in FIG. 1 but is shown by way of example in FIG. 2, and the second contact body 12 is electrically connected to the rail vehicle via a second power line, which is likewise not visible in FIG. 1. The first power line 24 and the second power line are guided into the rail vehicle and supply drives and other units of the rail vehicle with electricity.

The first contact body 11 and the second contact body 12 are electrically insulated from the first bearing apparatus 21 and the second bearing apparatus 22, where the first guide apparatus 13, the second guide apparatus 14, the third guide apparatus 15, the fourth guide apparatus, the first spring apparatus 18, the second spring apparatus 19, the third spring apparatus 20, the fourth spring apparatus, the first housing 16 and the second housing 17 are formed as electrical insulators.

The first contact body 11 and the second contact body 12 are oriented parallel to a vehicle transverse axis 25, which appears in the projecting plane in FIG. 1. The first housing 16 and the second housing 17 are oriented parallel to a vehicle longitudinal axis 26, i.e., rotated by 90° relative to the first contact body 11 and the second contact body 12 as a result of the first guide apparatus 13, the second guide apparatus 14, the third guide apparatus 15 and the fourth guide apparatus.

In accordance with the invention, it is however also conceivable for the first housing 16 and the second housing 17 for example to be oriented parallel to the vehicle transverse axis 25.

In accordance with the invention, it is further conceivable for the current collector to be connected to an electric commercial vehicle (for example, an electric bus or an electric truck) and function as a charging current collector, where the first contact body 11 and the second contact body 12 function as contact strips of a contact head and can be brought into mechanical and electrical contact with a docking hood of a stationary charging station for the purpose of charging battery packs of the commercial vehicle.

It is also conceivable for the current collector to be used on an electric commercial vehicle (for example, on an electric truck or an electric bus) that travels along an electrified street or highway.

In a schematic front view, FIG. 2 discloses an exemplary first embodiment of an electrical contacting apparatus in accordance with to the invention. The contacting apparatus, which is formed as a rocker, is connected to a current collector of a vehicle and comprises a first contact body 11 and a second contact body 12 as shown in FIG. 1 and FIG. 3, where the contact bodies are formed as contact strips.

Figure 3:
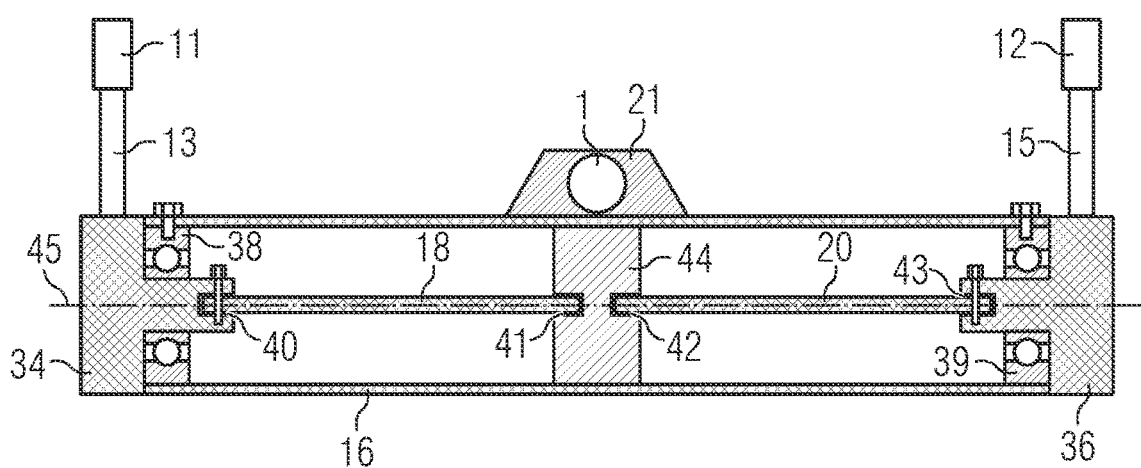
FIG. 3 shows a schematic sectional illustration of the exemplary first embodiment of an inventive electrical contacting apparatus, in a side view.

The contacting apparatus additionally has a first guide apparatus 13, a second guide apparatus 14, a third guide apparatus 15 as shown in FIG. 3, and a fourth guide apparatus (not visible).

The contacting apparatus additionally comprises a first bearing apparatus 21 and a second bearing apparatus 22, which are connected via a first housing 16 and a second housing 17 to the first guide apparatus 13, the second guide apparatus 14, the third guide apparatus 15 and the fourth guide apparatus. The contacting apparatus is connected to a current collector linkage 1 in an articulated manner via the first bearing apparatus 21 and the second bearing apparatus 22.

The first guide apparatus 13 has a first guide rod 27 and a second guide rod 28, the second guide apparatus 14 a third guide rod 29 and a fourth guide rod 30. The first guide rod 27, the second guide rod 28, the third guide rod 29 and the fourth guide rod 30 are formed in a fiberglass-reinforced synthetic material.

The contacting apparatus also has a first mounting apparatus 34 and a second mounting apparatus 35.

The third guide rod 29 is connected via an elastic first swivel joint 31 to the first contact body 11, and the fourth guide rod 30 via a second swivel joint 32 to the third guide rod 29. The fourth guide rod 30 is also fixedly connected via a screw connection to the second mounting apparatus 35, this again being rotatably connected to the second housing 17.

The first guide rod 27 is connected via an elastic connecting element 37 to the first contact body 11, and the second guide rod 28 via a third swivel joint 33 to the first guide rod 27. The second guide rod 28 is also fixedly connected to the first mounting apparatus 34, this again being rotatably connected to the first housing 16.

The second contact body 12 is connected via the third guide apparatus 15 and via a third mounting apparatus 36 shown in FIG. 3 to the first housing 16 and via the fourth guide apparatus and a fourth mounting apparatus (not visible) to the second housing 17.

The second contact body 12, the third guide apparatus 15, the fourth guide apparatus, the third mounting apparatus 36 and the fourth mounting apparatus are formed in terms of relative arrangement, materials and construction so as to be comparable with the first contact body 11, the first guide apparatus 13, the second guide apparatus 14, the first mounting apparatus 34 and the second mounting apparatus 35.

A first spring apparatus 18 is provided in a first interior of the first housing 16 and is fixedly connected via a screw connection to the first mounting apparatus 34. A second spring apparatus 19 is provided in a second interior of the second housing 17 and is fixedly connected via a screw connection to the second mounting apparatus 35. A third spring apparatus 20 shown in FIG. 3 and also arranged in the first interior of the first housing 16 is screwed to the third mounting apparatus 36.

A fourth spring apparatus (not visible), which is also arranged in the second interior of the second housing 17, is screwed to the fourth mounting apparatus.

The first spring apparatus 18, the second spring apparatus 19, the third spring apparatus 20 and the fourth spring apparatus are formed as torsion springs and each have a rectangular cross section.

The first spring apparatus 18 and the third spring apparatus 20 are additionally connected in a non-rotatable manner via displaceable bearing arrangements to the first housing 16, the second spring apparatus 19 and the fourth spring apparatus being connected in a non-rotatable manner via displaceable bearing arrangements to the second housing 17. This is described with reference to the first spring apparatus 18 and the third spring apparatus 20 as per FIG. 3 by way of example.

The first contact body 11 and the second contact body 12 are electrically insulated from the first bearing apparatus 21 and the second bearing apparatus 22, where the first guide apparatus 13, the second guide apparatus 14, the third guide apparatus 15, the fourth guide apparatus, the first spring apparatus 18, the second spring apparatus 19, the third spring apparatus 20, the fourth spring apparatus, the first mounting apparatus 34, the second mounting apparatus 35, the third mounting apparatus 36, the fourth mounting apparatus, the first housing 16 and the second housing 17 are formed as electrical insulators.

The first contact body 11 is electrically connected to the vehicle via a first power line 24, the second contact body 12 via a second power line (not visible in FIG. 2). The first power line 24 and the second power line are guided into the vehicle and supply drives and further units of the vehicle with electricity.

The first power line 24 and the second power line adapt in a flexible manner to deflections of the current collector.

FIG. 3 schematically illustrates the same exemplary first embodiment of an inventive electrical contacting apparatus for a current collector of a vehicle as shown in FIGS. 1 and 2. Therefore some reference characters used in FIG. 3 are identical to those in FIGS. 1 and 2. Unlike FIG. 2, which shows a front view of the contacting apparatus, FIG. 3 shows a sectional side view of the contacting apparatus, giving a view of the contacting apparatus which is rotated by 90° relative to the front view.

The contacting apparatus comprises a first contact body 11, a second contact body 12, a first guide apparatus 13, a second guide apparatus 14 as shown in FIG. 2, a third guide apparatus 15, a fourth guide apparatus (not visible), a first housing 16 and a second housing 17 as shown in FIG. 2, these being connected to a first mounting apparatus 34, a second mounting apparatus 35 as shown in FIG. 2, a third mounting apparatus 36 and a fourth mounting apparatus (not visible).

Connected to the first mounting apparatus 34 is a first spring apparatus 18, to the second mounting apparatus 35 a second spring apparatus 19 as illustrated in FIG. 2, to the third mounting apparatus 36 a third spring apparatus 20, and to the fourth mounting apparatus a fourth spring apparatus (not visible).

The contacting apparatus also has a first bearing apparatus 21 which is fixedly connected to the first housing 16, and as shown in FIG. 2 a second bearing apparatus 22 which is fixedly connected to the second housing 17, via which the contacting apparatus is connected in an articulated manner to a current collector linkage 1.

The first contact body 11 is connected via the first guide apparatus 13 to the first mounting apparatus 34, the first guide apparatus 13 and the first mounting apparatus 34 being screwed together. The first mounting apparatus 34 is rotatably connected via a first rolling bearing 38 to the hollow cylindrical first housing 16. The first rolling bearing 38 is screwed to the first housing 16.

The face of the first mounting apparatus 34 has a first slot 40, into which a first end of the first spring apparatus 18 is inserted and secured by a screw.

The first spring apparatus 18 is formed as a torsion spring, has a rectangular cross section and is mounted in a non-rotatable and displaceable manner via its second end in a second slot 41 of a cylindrical gripping piece 44, this being fixedly mounted in the first housing 16. The second slot 41 is milled out from a first face of the gripping piece 44.

Provided on a second face of the gripping piece 44 is a third slot 42, via which the third spring apparatus 20 is connected to the first housing 16 in a non-rotatable and displaceable manner. The third spring apparatus 20 is additionally connected to a third mounting apparatus 36 via insertion into a fourth slot 43, this being provided in the face of the third mounting apparatus 36, and a screw connection. The third spring apparatus 20 is formed as a torsion spring and is structured in the same way as the first spring apparatus 18 with respect to material, geometry, connection technique and orientation.

The first spring apparatus 18 and the third spring apparatus 20 have one and the same longitudinal axis 45.

The first spring apparatus 18, the third spring apparatus 20 and the gripping piece 44 are arranged in a first interior of the first housing 16.

A housing longitudinal axis of the first housing 16 and the longitudinal axis 45 of the first spring apparatus 18 and the third spring apparatus 20 extend into each other.

The third mounting apparatus 36 is rotatably connected to the first housing 16 via a second rolling bearing 39, this being screwed to the first housing 16 in the same way as the first rolling bearing 38.

The third guide apparatus 15 is screwed to the third mounting apparatus 36. The third guide apparatus 15 is in turn connected to the second contact body 12.

The second bearing apparatus 22 is formed, structurally and with respect to its connection to the current collector linkage 1, in the same manner as the first bearing apparatus 21.

The second housing 17 and the housing contents thereof comprising the second spring apparatus 19 and the fourth spring apparatus are formed so as to be structurally and functionally identical to the first housing 16 and the housing contents thereof. The second housing 17 is arranged and oriented parallel to the first housing 16.

The first contact body 11 and the second contact body 12 are electrically insulated from the first bearing apparatus 21 and the second bearing apparatus 22, where the first guide apparatus 13, the second guide apparatus 14, the third guide apparatus 15, the fourth guide apparatus, the first spring apparatus 18, the second spring apparatus 19, the third spring apparatus 20, the fourth spring apparatus, the first mounting apparatus 34, the second mounting apparatus 35, the third mounting apparatus 36, the fourth mounting apparatus, the first housing 16 and the second housing 17 are designed in a fiberglass-reinforced synthetic material and consequently as electrical insulators. The fiberglass-reinforced synthetic material that is used has a resistivity that is higher than $10^{10}$ Ω·cm and a breakdown voltage higher than 20 kV/mm. The first bearing apparatus 21 and the second bearing apparatus 22 have ground potential.

In accordance with disclosed embodiments of the invention, it is also conceivable, for example, for the first guide apparatus 13, the second guide apparatus 14, the third guide apparatus 15, the fourth guide apparatus, the first spring apparatus 18, the second spring apparatus 19, the third spring apparatus 20, the fourth spring apparatus, the first mounting apparatus 34, the second mounting apparatus 35, the third mounting apparatus 36 and the fourth mounting apparatus to be formed in a metallic material if an insulation effect of the first spring apparatus 18, the second spring apparatus 19, the third spring apparatus 20, the fourth spring apparatus, the first housing 16 and the second housing 17 are sufficient.

The first contact body 11 is electrically connected to the vehicle via a first power line 24 that is visible in FIG. 2, the second contact body 12 via a second power line (not visible). The first power line 24 and the second power line are guided into the vehicle and supply drives and further units of the vehicle with electricity.

Figure 4:
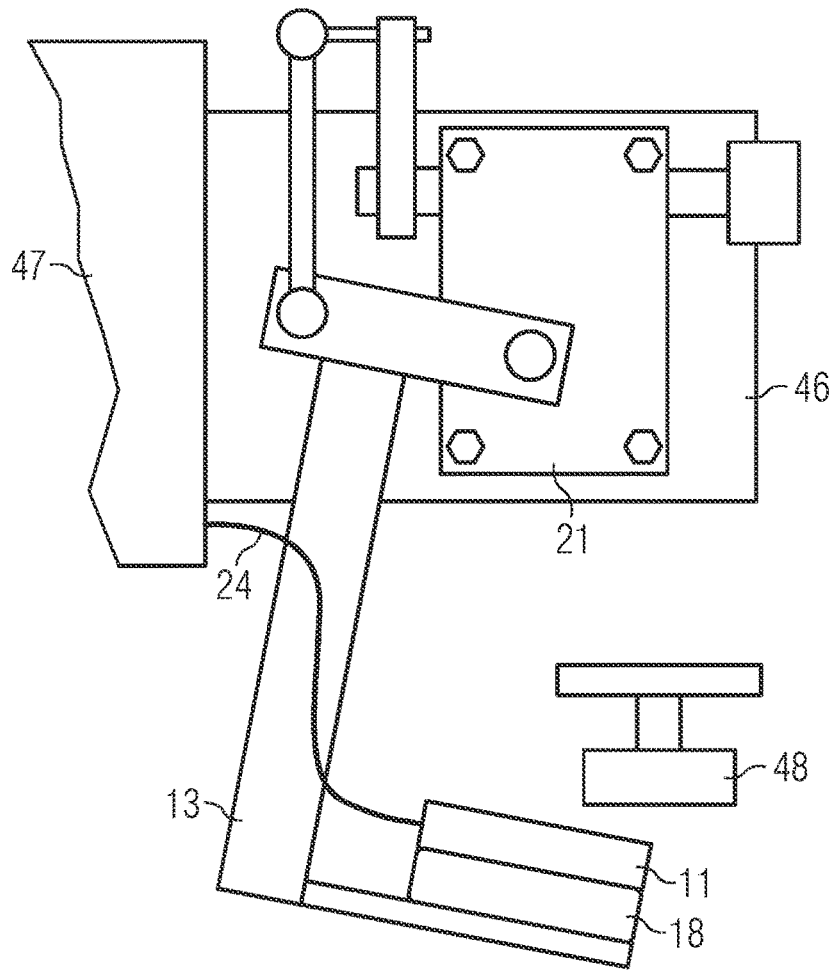
FIG. 4 shows a schematic illustration of an exemplary second embodiment of an inventive electrical contacting apparatus, having a first contact body that is formed as a contact shoe of a lateral current collector, in a side view.

FIG. 4 illustrates a schematic illustration of an exemplary second embodiment of an inventive electrical contacting apparatus, having an electrical first contact body 11 that is formed as a contact shoe of a lateral current collector for a rail vehicle, in a side view.

The first contact body 11 is coupled via a first spring apparatus 18 and a first guide apparatus 13 to a first bearing apparatus 21. The first bearing apparatus 21 is connected to a current collector holder 46, which in turn is coupled laterally to a chassis frame 47 of the rail vehicle.

As a result of deflecting the first guide apparatus 13, the first contact body 11 can rest against a conductor rail 48, whereby the rail vehicle is supplied with electricity.

The first spring apparatus 18 is formed as a rubber spring element and functions as an electrical insulator. The rubber spring element is formed as an ethylene-propylene copolymer.

The first contact body 11 and the first bearing apparatus 21 are consequently electrically insulated from each other. The first bearing apparatus 21 has ground potential. The first contact body 11 is electrically connected to the chassis frame 47 via a first power line 24, which adapts in a flexible manner to deflections of the first contact body 11.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An electrical contacting apparatus for a current collector of a vehicle, comprising:

at least an electrical first contact body which is coupled via at least a first spring apparatus to at least a first bearing apparatus, the at least first bearing apparatus being connectable to a current collector linkage or to a current collector holder, and the at least first contact body be electrically connectable to a vehicle;

wherein the at least first contact body and the at least first bearing apparatus are electrically insulated from each other;

wherein the at least first spring apparatus is formed as an electrical insulator;

wherein the at least first spring apparatus is connected via a first housing to the at least first bearing apparatus, the at least first spring apparatus being mounted within and being encased by the first housing and the first housing being formed as an electrical insulator; and wherein the at least first contact body is coupled via at least a first guide apparatus to the at least first bearing apparatus and at least a first guide rod of the at least first guide apparatus is formed as an electrical insulator.

2. The electrical contacting apparatus as claimed in claim 1, wherein the at least first spring apparatus is formed in a fiberglass-reinforced synthetic material.

3. The electrical contacting apparatus as claimed in claim 2, wherein the at least first spring apparatus is formed as a torsion spring.

4. The electrical contacting apparatus as claimed in claim 1, wherein the at least first spring apparatus is formed as a rubber spring element.

5. The electrical contacting apparatus as claimed in claim 1, wherein the first housing is formed in a fiberglass-reinforced synthetic material.

6. The electrical contacting apparatus as claimed in claim 1, wherein the at least first guide rod is formed in a fiberglass-reinforced synthetic material.

7. The electrical contacting apparatus as claimed in claim 1, wherein the at least first contact body is formed as a contact strip of a rocker for at least one of a roof current collector, a rail vehicle and an electric commercial vehicle.

8. The electrical contacting apparatus as claimed in claim 1, wherein the at least first contact body is formed as a contact shoe for a lateral current collector for a rail vehicle.

9. The electrical contacting apparatus as claimed in claim 1, wherein the at least first contact body is formed as a contact head for a charging current collector for an electric commercial vehicle.

10. A current collector for a vehicle having at least one electrical contacting apparatus as claimed in claim 1.

11. A vehicle having at least one current collector as claimed in claim 10.

* * * * *